(12) United States Patent
Shahar et al.

(10) Patent No.: US 9,002,084 B2
(45) Date of Patent: Apr. 7, 2015

(54) SYSTEMS AND METHODS FOR SUMMING SIGNALS FROM AN IMAGING DETECTOR

(71) Applicant: General Electric Company, Schenectady, NY (US)

(72) Inventors: Arie Shahar, Moshav Magshimim (IL); Eliezer Traub, Ramat-Gan (IL); Peter Rusian, Ashdod (IL); Yaron Glazer, Rehovot (IL); Danny Magal, Rehovot (IL); Zeev Gerber, Tirat Carmel (IL)

(73) Assignee: GE Medical Systems Israel, Ltd, Tirat Hacarmel (IL)

( * ) Notice: Subject to any disclaimer, the term of this patent is extended or adjusted under 35 U.S.C. 154(b) by 92 days.

(21) Appl. No.: 14/014,726

(22) Filed: Aug. 30, 2013

(65) Prior Publication Data

US 2015/0063671 A1 Mar. 5, 2015

(51) Int. Cl.
*G06K 9/00* (2006.01)
*G01T 1/164* (2006.01)

(52) U.S. Cl.
CPC ..................................... *G01T 1/164* (2013.01)

(58) Field of Classification Search
USPC .................. 382/124–127, 128–134, 181–231
See application file for complete search history.

(56) References Cited

U.S. PATENT DOCUMENTS

| | | | | |
|---|---|---|---|---|
| 4,421,986 A | * | 12/1983 | Friauf et al. | 250/369 |
| 4,852,135 A | * | 7/1989 | Anisovich et al. | 378/49 |
| 5,148,809 A | * | 9/1992 | Biegeleisen-Knight et al. | 600/443 |
| 5,245,191 A | * | 9/1993 | Barber et al. | 250/363.04 |
| 5,273,910 A | * | 12/1993 | Tran et al. | 438/69 |
| 5,504,334 A | | 4/1996 | Jansen et al. | |
| 5,562,095 A | * | 10/1996 | Downey et al. | 600/445 |
| 5,754,690 A | | 5/1998 | Jackson et al. | |
| 5,771,308 A | * | 6/1998 | Florent | 382/130 |
| 5,825,033 A | | 10/1998 | Barrett et al. | |
| 5,847,398 A | | 12/1998 | Shahar et al. | |
| 6,002,741 A | | 12/1999 | Eisen et al. | |
| 6,169,287 B1 | * | 1/2001 | Warburton | 250/370.1 |
| 6,618,185 B2 | | 9/2003 | Sandstrom | |
| 7,187,790 B2 | * | 3/2007 | Sabol et al. | 382/128 |
| 7,490,085 B2 | * | 2/2009 | Walker et al. | 1/1 |

(Continued)

OTHER PUBLICATIONS

"Charge Transport in Arrays of Semiconductor Gamma-Ray Detectors," H.H. Barrett, Physical Review Letters, vol. 75, No. 1, Jul. 1995.

(Continued)

*Primary Examiner* — Alex Liew
(74) *Attorney, Agent, or Firm* — Dean Small; The Small Patent Law Group, LLC.

(57) ABSTRACT

A system includes a detector and a processing module. The detector includes pixels configured to detect an event corresponding to energy from a radiopharmaceutical. The processing module is configured to receive a request for each pixel that detects energy during a reading cycle. The processing module is configured to determine an energy level for each requesting pixel. For each requesting pixel, the processing module is configured to count the event when the energy level corresponds to an energy of the radiopharmaceutical, and to determine a combined energy level of the pixel and at least one adjacent pixel when the energy level does not correspond. The processing module is configured to count the event when the combined energy level corresponds to the energy of the radiopharmaceutical, and to disregard the event when the combined energy level does not correspond to the energy of the radiopharmaceutical.

22 Claims, 5 Drawing Sheets

(56) References Cited

U.S. PATENT DOCUMENTS

| | | |
|---|---|---|
| 7,495,228 B1 | 2/2009 | Albagli et al. |
| 7,508,509 B2 | 3/2009 | Lehtikoski et al. |
| 7,692,156 B1 | 4/2010 | Nagarkar |
| 8,405,038 B2 | 3/2013 | Bouhnik et al. |
| 2003/0099026 A1 | 5/2003 | Sandstrom |
| 2003/0128324 A1 | 7/2003 | Woods et al. |
| 2004/0195512 A1 | 10/2004 | Crosetto |
| 2005/0139777 A1 | 6/2005 | Rostaing et al. |
| 2006/0086913 A1 | 4/2006 | Spahn |
| 2006/0285751 A1* | 12/2006 | Wu et al. ............... 382/199 |
| 2007/0023669 A1* | 2/2007 | Hefetz et al. ............. 250/370.14 |
| 2009/0110144 A1 | 4/2009 | Takahashi et al. |

OTHER PUBLICATIONS

"Signals Induced in Semiconductor Gamma-Ray Imaging Detectors," J.D. Eskin, Journal of Applied Physics, vol. 85, No. 2, Jan. 1999.

"High-Resolution p-i-n CdTe and CdZnTe X-Ray Detectors With Cooling and Rise-Time Discrimination," A. Niemela, IEEE Transactions on Nuclear Science, vol. 43, No. 3, Jun. 1996.

\* cited by examiner

SYSTEMS AND METHODS FOR SUMMING SIGNALS FROM AN IMAGING DETECTOR

BACKGROUND OF THE INVENTION

The subject matter disclosed herein relates generally to imaging systems and techniques.

Detectors for diagnostic imaging systems, for example, detectors for single photon emission computed tomography (SPECT) and computed tomography (CT) imaging systems are often produced from semiconductor materials, such as Cadmium Zinc Telluride (CdZnTe), often referred to as CZT, Cadmium Telluride (CdTe) and Silicon (Si), among others. These semiconductor detectors typically include arrays of pixelated detector modules.

In pixelated detectors, charge-sharing between two or more adjacent pixels may occur. Charge-sharing is caused by photon absorption in a gap between adjacent pixels. The charge sharing causes each of the signals for the pixels to be out of the photo-absorption energy window (the energy range of an isotope used for imaging), and, therefore, rejected as being generated by photons that suffer from Compton Scattering in the body of a patient, which are not suitable for imaging purposes.

Also, Compton Scattering may occur in the detector, with the amount of Compton Scattering inside the detector increasing with photon energy. Photons absorbed in the detector may be absorbed by one step including photo-electric absorption or by a series of multiple steps including one or more steps of Compton Scattering that ends with photo-electric absorption. The chain of multiple Compton Scattering may occur in several adjacent pixels. In such a case, the energy of the photon is absorbed and shared between several pixels, causing each of the signals for the pixels to be out of the photo-absorption energy window. Such signals may thus be interpreted as being generated by photons that suffer Compton Scattering in the patient body and rejected.

Neighbor summing (summing signals received in adjacent pixels to recover the energy of neighboring pixels into one signal that is located within the photo-electric absorption energy window) may be attempted to address these issues. Conventionally, neighbor summing may be performed by a variety of techniques including verifying if the signals are in time coincidence within a specified time window.

However, such neighbor summing is not without drawbacks. For example, the determination or verification of whether signals are in time coincidence may present drawbacks. In CZT detectors, for example, the timing of a trigger signal indicating timing proportional to the absorption time of a photon in a pixel depends on the depth of interaction (DOI) of the absorbed photon in the detector. Thus, the timing of the trigger signal is strongly dependent on the DOI and therefore is not accurate enough to serve for time coincident measurements. Accordingly, the trigger signal may be derived from the cathode of the CZT detector. The cathode is a large contact and may produce a trigger signal immediately upon absorption of a photon in the detector. However, deriving the trigger signal from the cathode is difficult to implement because the signal is noisy. Also, the signal may need to be fed into an input from a remote distance. The relatively high noise produced by a large cathode requires the use of a relatively high threshold level in the input of a comparator in an electronic channel of a pixel to prevent propagation, in the electronic channels of the detector pixels, of the relatively high noise produced by the large cathode. The use of the high threshold level also causes rejection of all signals below the relatively high threshold level. Thus, many events for which charges are shared between pixels may be rejected as being too small due to the required high threshold level when the signal is derived from the cathode. As a result, the summing process may be inefficient when using timing derived from the cathode contact.

BRIEF DESCRIPTION OF THE INVENTION

In accordance with various embodiments, a system is provided including a detector and a processing module. The detector includes multiple pixels. The pixels are configured to detect an event corresponding to energy received during an imaging scan, for example a nuclear medicine scan using a radiopharmaceutical. The processing module includes at least one processor and at least one memory. The processing module is configured to receive a request for a reading of energy for each pixel of the detector that detects received energy above a predetermined level during a reading cycle. The processing module is further configured to determine, responsive to a request, an energy level of the energy for each requesting pixel responsive to the request. For each requesting pixel, the processing module is configured to count the event for the pixel when the energy level of the pixel is determined to correspond to an energy of the radiopharmaceutical. The processing module is also configured to identify an energy level of at least one adjacent pixel and determine the combined energy level of the pixel and the at least one adjacent pixel when the energy level of the pixel is determined not to correspond to the energy of the radiopharmaceutical. The processing module is configured to count the event for at least one of the pixel or the at least one adjacent pixel when the combined energy level is determined to correspond to the energy of the radiopharmaceutical. Also, the processing module is configured to disregard the event when the combined energy level is determined not to correspond to the energy of the radiopharmaceutical.

In accordance with various embodiments, a method is provided that includes detecting, during a reading cycle, with a multi-pixel detector, an event corresponding to energy received during a nuclear medicine (NM) scan using a radiopharmaceutical. The method also includes requesting a reading of energy for each pixel that detects received energy above a predetermined level. The method further includes determining an energy level of the energy for each requesting pixel responsive to the request. For each requesting pixel, if the energy level of the pixel is determined to correspond to an energy of the radiopharmaceutical, the method includes counting the event for the pixel. If the energy level of the pixel is determined not to correspond to the energy of the radiopharmaceutical, the method includes identifying an energy level of at least one adjacent pixel and determining the combined energy level of the pixel and the at least one adjacent pixel. If the combined energy level is determined to correspond to the energy of the radiopharmaceutical, the event is counted for at least one of the pixel or the at least one adjacent pixel, and, if the combined energy level is determined not to correspond to the energy of the radiopharmaceutical, the event is disregarded. In some embodiments, determining that no adjacent pixel has a corresponding energy level may be understood as identifying an energy level of an adjacent pixel (e.g., an energy level of zero) and determining that the combined energy level (e.g., the previous energy level below the range plus zero) does not correspond to the energy level of the radiopharmaceutical. In accordance with various embodiments, it should be noted that the energy level corresponding to the radiopharmaceutical energy may have different values for when the energy level relates to a single event impacting a single pixel, and for when the energy level relates to the combined energy of multiple events derived from plural pixels (e.g., adjacent pixels and/or pixels corresponding to consecutive events).

In accordance with various embodiments, tangible and non-transitory computer readable medium is provided that includes one or more computer software modules configured to direct one or more processors to detect, during a reading cycle, with a multi-pixel detector, an event corresponding to energy received during a nuclear medicine (NM) scan using a radiopharmaceutical. The one or more computer software modules are also configured to direct the one or more processors to request, based on the received energy, a reading of energy for each pixel that detects received energy above a predetermined level. The one or more computer software modules are configured to direct the one or more processors to determine an energy level of the energy for each requesting pixel responsive to the request. For each requesting pixel, if the energy level of the pixel is determined to correspond to an energy of the radiopharmaceutical, the event is counted for the pixel. If the energy level of the pixel is determined not to correspond to the energy of the radiopharmaceutical, the one or more computer software modules are configured to direct the one or more processors to identify an energy level of at least one adjacent pixel and determine the combined energy level of the pixel and the at least one adjacent pixel. If the combined energy level is determined to correspond to the energy of the radiopharmaceutical, the event is counted for at least one of the pixel or the at least one adjacent pixel, but if the combined energy level is determined not to correspond to the energy of the radiopharmaceutical, the event is disregarded.

DETAILED DESCRIPTION OF THE INVENTION

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "image" or similar terminology is not intended to exclude embodiments in which data representing an image is generated, but a viewable image is not. Therefore, as used herein the term "image" broadly refers to both viewable images and data representing a viewable image. However, certain embodiments generate, or are configured to generate, at least one viewable image.

Various embodiments provide systems and methods for summing energies of adjacent pixels without utilizing or requiring the use of time-coincidence measurements. For example, in some embodiments, neighbor summing may be performed as follows. First, cyclic reading of only electric channels (e.g., pixels or channels corresponding to pixels) of a detector that have received energy (e.g., only channels for which a Peak & Hold (P&H) is occupied by a signal) may be performed. For example, a request signal may be sent, to a field programmable gate array (FPGA) for each pixel corresponding to a channel for which a P&H is occupied by a signal. Thus, the FPGA may send select signals for reading signals stored in the P&H of only those channels for which a request was sent. Reading only the electronic channels that have an occupied P&H shortens the reading cycle time (time to read all appropriate channels). Shortening the reading cycle time acts to reduce errors associated with reading cycles and energy summing, as discussed herein. Second, for any channels or pixels for which the energy was read which do not fall within a predetermined energy range (e.g., below the predetermined range) corresponding to the energy range of the isotope, the signals may be summed with one or more adjacent pixels for which an energy outside of the predetermined range (e.g., below the predetermined range) was read during the same reading cycle. Adjacent pixels in some embodiments may be understood as being horizontally or laterally disposed next to each other with no other pixels therebetween, or as sharing an edge or having a common side boundary defined by a gap contacting each pixel. Third, each summed energy is then checked to determine if the summed energy falls within a predetermined range corresponding to the energy range of the isotope. For example, the energy range may be defined as including $E_p \pm \Delta E/2$, where $E_p$ is the energy of the isotope used for imaging, and $\Delta E$ is half of the full width half maximum height (FWHM) range of the energy window used for the imaging.

It may be noted that a correction factor may be employed for the energy range used for the summed energies. Charge-sharing events may be produced in regions between anodes, or in gaps between pixels. Events that are created in the regions between anodes usually suffer from charge loss. Accordingly, the energies of one or more charge-sharing events may not be summed to the original energy of the isotope used for imaging, even if the charge-sharing events are genuinely related to the same charge-sharing event. Such a correction factor may be determined theoretically and/or experimentally and used to correct the summed energies of charge-sharing events to be similar to the energy of the isotope.

In some embodiments, the reading cycle may be selected to be of a short enough duration relative to the event cycle (e.g., average count rate per pixel per second for a given scanning procedure) such that each event may be read immediately, without event accumulation (e.g., only one event per reading cycle). For example, the reading cycle for an entire detector may be faster than the average time between events in the detector. In other embodiments, the event cycle may be faster relative to the reading cycle, with more than one event per reading cycle.

First, an example scenario in which the event rate is relatively slow (e.g., reading cycle for detector is faster than average time between events) will be considered. In such a case, each event may be read substantially immediately, without event accumulation, and with the reading of each event performed in the order of appearance or creation. Further, for each reading cycle, only one event is expected to be read. If more than one event is read during a reading cycle of the detector, there is a high probability that the events were created simultaneously, as would be the case for charge-sharing or for Compton Scattering in the detector. Accordingly, if more than one event appears in a reading cycle and 1) those events are acquired from adjacent pixels, and 2) the summed energies of the events correspond to the isotope energy (in some embodiments, using a correction factor as discussed herein), then the sum of the events may be considered as a single event suitable for imaging purposes. For example, one of the two events may be identified as a single event and used for counting or imaging purposes. Thus, one of the two events may be used to represent both of the shared events for imaging purposes. In various embodiments, an alternative approach may be employed as follows: 1) If it is determined that the event rate is low enough, and satisfies the condition in which the average time between consecutive events is longer than the reading time-cycle of all the pixels in the detector-module, and, if, under these conditions more than one event appears in a reading cycle, those events may be acquired from adjacent pixels or be highly likely to be acquired from adjacent pixels. 2) In addition, if the summed energies of these events correspond to the isotope energy (in some embodiments, using a correction factor as discussed herein), then the sum of the events may be considered as a single event suitable for imaging purposes. For example, one of the two events may be identified as a single event and used for counting or imaging purposes. Thus, one of the two events may be used to represent both of the shared events for imaging purposes. In this alternative concept, the sequential order of the events within a given reading cycle indicates that the sequential events were produced in adjacent pixels without requiring expressly checking if the events were produced in adjacent pixels. Eliminating the need to check whether the signals acquired from neighbor pixels simplifies the summing process, as pixel maps, conversion tables, and/or special software associated with checking whether pixels are adjacent may be avoided.

Next, an example scenario in which the event rate is higher will be considered. With a higher or faster event rate, there is a possibility that more than one event will be read during the reading cycle of a detector (e.g., a detector system, detector head, or camera for an entire system, among others). However, if the reading rate between events is sufficiently faster than the average time between consecutive events, the events still may be read in order of the creation of the events. Thus, the criteria used to identify events as charge-sharing events and/or Compton Scattering in the detector include checking if the events are produced proximate to each other (e.g., the events are following or consecutive events), and if the events are produced in adjacent pixels. In some embodiments, for each event occurring in a stream of events that does not fall on its own within the energy range of the isotope, the energy may be summed together with either a previous or following event (e.g., consecutive events in the sequence of events read by the readout unit in an adjacent pixel) that does not fall within the energy range on its own. The pairs of events that occur consecutively and for which the summed energy corresponds to the energy range of the isotope (in some embodiments, using a correction factor as discussed herein) may be considered as suitable for energy summing and used in imaging. Thus, in the example scenario having a higher event rate (more frequent incidence of photons upon a detector) the following may be performed: First, cyclic reading of only those channels having a P&H occupied by a signal (e.g., channels requesting reading) may be performed. Second, two consecutive events read responsive to such requests that do not fall within an energy range of the isotope on their own may be summed. Third, the summed consecutive events may be checked to verify if the events are from adjacent pixels, and considered further only if the events are from adjacent pixels. Fourth, the summed events may be considered and used in imaging if the summed energy of the consecutive events is within a predetermined energy range. For example, one of the two consecutive events may be identified as a single event and used for counting or imaging purposes. In this case, consecutive events (an event-pair including an event and the following event or an event-pair including an event and the previous event) have a very high probability of being produced in neighbor pixels. Thus, in some embodiments, consecutive events may be considered events acquired from neighboring or adjacent pixels. Accordingly, alternative criteria that does not include neighboring-checking may be used, for this case, to sum signals from events produced in adjacent pixels. According to this alternative approach, the following may be performed: First, cyclic reading of only those channels having a P&H occupied by a signal (e.g., channels requesting reading) may be performed. Second, two consecutive events (an event pair including an event and the following event or an event and the previous event) are read in response to requests that do not fall within an energy range of the isotope on their own, and are summed. Third, the summed events may be considered and used in imaging if the summed energy of the consecutive events is within a predetermined energy range. For example, one of the two consecutive events may be identified as a single event and used for counting or imaging purposes. In this alternative concept, there is no need to expressly check whether the multiple events relate to neighbor pixels, since the sequential order indicates that the events were produced in adjacent pixels. Eliminating the need to check whether signals were acquired from neighbor pixels simplifies the summing process, because pixel maps, conversion tables, special software, or the like used to check whether the pixels are adjacent or not may be avoided. Additional simplification may be achieved by eliminating the need for measuring coincidence timing as discussed herein, resulting in simplified processing requirements and/or components, such as Application Specific Integrated Circuits (ASIC) and/or other electronics. Thus, in various embodiments, a novel technique to sum signals from neighbor pixels to properly recover charge-sharing between pixels produced by charge splitting between pixels and Compton scattering in the detector may not include the criteria of time coincidence and neighbor checking, resulting in dramatic simplifications.

In some embodiments, using only one of the criteria discussed above may not be sufficient alone to ensure, with low error probability, that the signals summed from adjacent pixels are actually produced by charge-sharing or Compton Scattering in the detector. However, as discussed herein (see, for example, discussion regarding error analysis following the discussion of the embodiment depicted in FIG. 2), combining various criteria discussed herein may ensure, with high probability, that identified events correspond to charge-sharing or Compton Scattering in the detector, and that random coincidence is rejected.

A technical effect of at least some embodiments is improved image quality. A technical effect of at least some embodiments is improved accuracy of nuclear medicine (NM) imaging scans. A technical effect of at least some embodiments is reduction in complexity, cost and/or time required for imaging procedures. A technical effect of at least some embodiments includes improved identification of shared-charge events and incidents of Compton Scattering in the detector, and use of such events or incidents in imaging. A technical effect of at least some embodiments includes improved recognition and counting of events suitable for use with imaging while discarding events not suitable for imaging.

Figure 1:
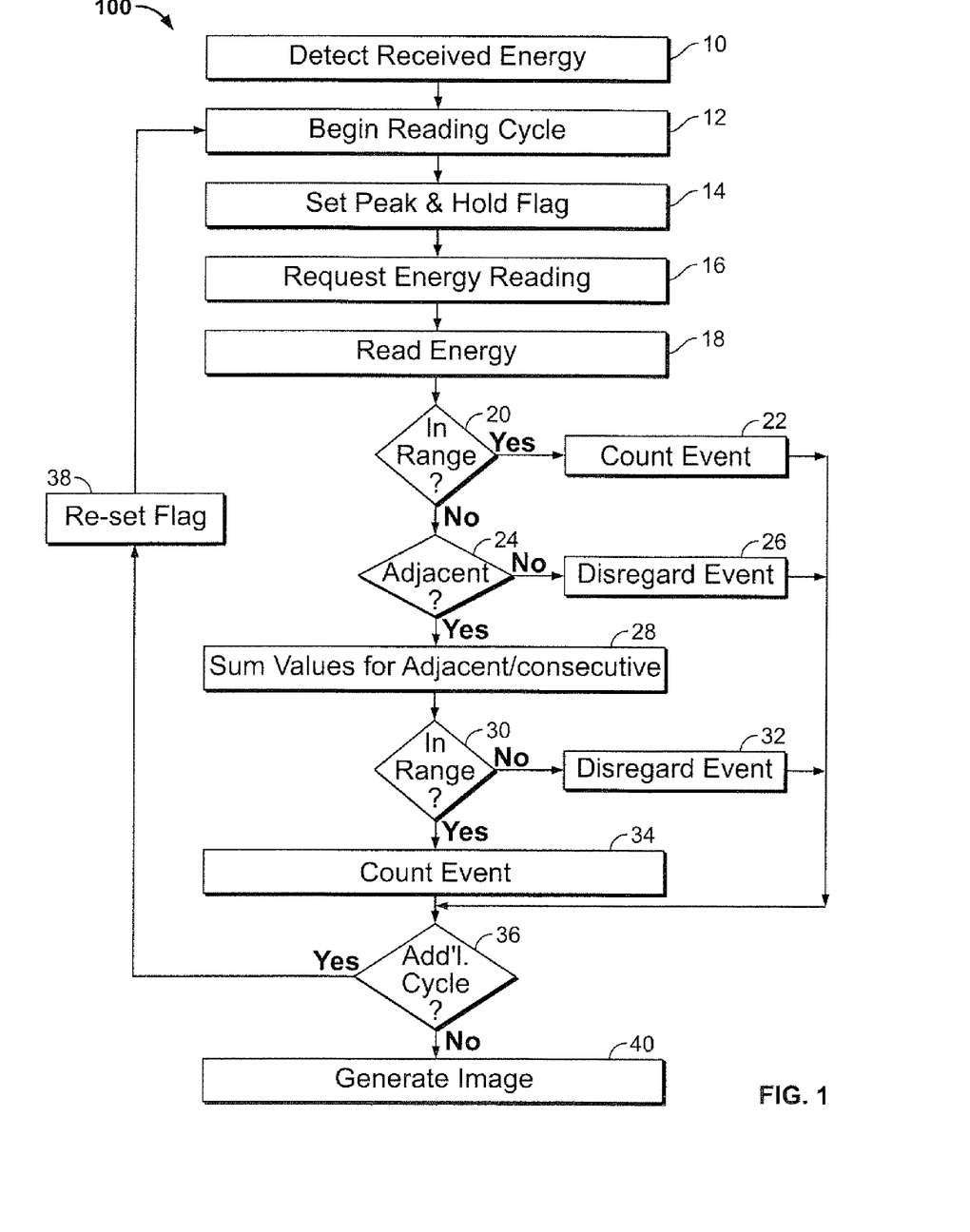
FIG. 1 is a flowchart of a method for generating an image in accordance with various embodiments.

FIG. 1 provides a flowchart of a method 100 for imaging a human or animal patient in accordance with various embodiments. In various embodiments, the method 100, for example, may employ or performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 100 may be able to be used as one or more algorithms to direct hardware to perform one or more operations described herein.

At 10, energy received by a detector is detected. For example, the detector may include multiple pixels configured to receive energy during an imaging scan. In some embodiments, the energy may be received in a nuclear medicine (NM) scan such as PET or SPECT, and the energy received may include photons striking one or more pixels of the detector, where the photons are from a radiopharmaceutical isotope that has previously been administered to a patient.

At 12, a reading cycle is begun. At the beginning of the reading cycle, a flag or other indicator of received energy for each pixel may be set at an off or idle position. During the reading cycle, one or more events (e.g., reported reception of energy by a pixel) may be read. In some embodiments, the event cycle (time between incidence of energy on one or more pixels) may be slow enough relative to the reading cycle that there is one event per reading cycle (or one event per most reading cycles). In other embodiments, there may be more events per reading cycle.

At 14, a Peak and Hold (P&H) flag is set for each channel that receives energy during the reading cycle. For example, each pixel or channel may have associated therewith circuitry (e.g., including one or more capacitors) configured to retain a peak of a received signal for reading. In some embodiments, the flag may be set responsive to any energy received by a pixel, while in other embodiments a flag may be set for each pixel that receives energy above a threshold level to reduce the setting of flags responsive to noise. In various embodiments, the peak value may be retained by a portion or aspect of the detector or by a portion or aspect of a processing module operably coupled with the detector. It should be understood that, as used herein, the reception or collection of energy or charge by a pixel may be measured by one or more of an electrical current or voltage that corresponds to or is proportional to the energy or charge received or collected.

At 16, an energy reading is requested. In the illustrated embodiment, a reading is requested for each channel for which a flag has been set at 14. In various embodiments, a request for a reading may be made by or on behalf of each pixel that receives energy corresponding to a potential event. For example, in some embodiments, a request may be made for each pixel receiving energy (e.g., each channel having a signal in corresponding P&H). In some embodiments, a request may be made for each pixel receiving energy above a predetermined amount corresponding to anticipated noise levels. For example, a request may not be made for any channels having a signal in a P&H that is below a noise threshold. The request for energy reading may be generated by a pixel, an aspect or portion of the detector and/or an aspect or portion of a processing module operably coupled with the detector. In some embodiments, setting a flag (e.g., a P&H flag) may be understood as requesting an energy reading.

At 18, the energy for one or more pixels is read or determined. In the depicted embodiment, the energy is only read or determined for requesting pixels (e.g., those with a P&H signal, or a P&H signal above a threshold) to minimize the time for a reading cycle. By only reading energy levels for requesting pixels, the reading cycle time is reduced compared to a reading cycle that would read energy levels for all pixels of detector. In some embodiments, a requesting pixel may have a request sign or flag that is in on or up position, respectively. After the reading at 18, the request sign or the request flag may be re-set to an off or down position, respectively.

At 20, it is determined if the energy for a given single event (energy read or determined for a single pixel) is within a predetermined range corresponding to energy of isotope. For example, it may be determined if the energy of a single pixel is within a range given by $E_p \pm \Delta E/2$, where $E_p$ is the energy of the isotope used for imaging, and $\Delta E$ is half of the full width half maximum height (FWHM) range of the energy window used for the imaging. The energy determined for the single pixel in some embodiments may be understood as corresponding to the energy of the isotope if the energy determined for the pixel is equal to the value of the energy for the isotope or within a predetermined range. If plural pixels request a reading or report a received energy during a reading cycle, the energy levels of each of the pixels may be read.

At 22, if the energy for a pixel determined at 20 satisfies the range criterion, the reception of the energy by the pixel or event may be interpreted as corresponding to reception of a photon of the isotope and thus suitable information for use in imaging. For each pixel, a running total of counted events suitable for imaging recorded during plural reading cycles of a scan may be maintained. After the scan, the total count for each pixel may be used to determine a shade of a gray scale to be assigned to the pixel in a reconstructed image. In various embodiments, the higher the total of counted events for a pixel, the brighter the shade or higher the value along the gray scale assigned to the pixel may be.

At 24, it is determined if any adjacent pixels have a corresponding event to the event of a pixel whose energy did not fall within the predetermined range (e.g., was below the minimum value of the range). For example, it may be determined if any adjacent pixels reported reception of energy, set a P&H flag, and/or requested a reading of energy. In some embodiments, only events within the same reading cycle may be considered. In some embodiments, only consecutive events (e.g., immediately following or preceding) may be considered when determining if any adjacent pixels have a corresponding event. In still other embodiments, where there is only one event per reading cycle or generally only one event per reading cycle, events from an immediately preceding reading cycle and/or an immediately following reading cycle may be considered. In some embodiments, an energy level for each adjacent pixel may be determined regardless of whether each adjacent pixel requested an energy reading. In some embodiments, no more than one adjacent pixel (e.g., an adjacent pixel having the highest energy level) may be considered. As another example, in other embodiments, energy levels from all adjacent pixels may be considered. In still other embodiments, an event and a consecutive event (e.g., from an immediately preceding reading and/or an immediately following reading) may be considered without performing neighbor checking. In this case, no neighbor checking may be conducted at 24, with a determination checking for consecutive events made instead at 24.

At 26, if no adjacent pixel has received energy, then the event is disregarded, with the event not being counted for any pixel. In some embodiments, no event may be counted if no adjacent pixel has received energy above a predetermined threshold level (e.g., a noise threshold). In still other embodiments, no event may be counted if there are no events consecutive to a first event for a first pixel in one or more adjacent pixels.

At 28, if at least one adjacent pixel has a corresponding event or an energy level above a threshold (or if a consecutively occurring event has been identified for an adjacent pixel), the energy values for the adjacent pixels (e.g., a pixel whose energy was determined at 18 and a pixel identified at 24) are summed. In some embodiments, the energy values are summed for a given pixel and only one adjacent pixel. In other embodiments, the energy values for a given pixel and more than one adjacent pixel may be summed. In still other embodiments, for example where consecutive events only were checked at 24 without expressly checking for neighboring or adjacent pixels, no neighbor-checking may be performed. In such embodiments, the energy values of consecutive events (as discussed above) are summed at 28.

At 30, it is determined if the summed or combined energy of the adjacent (and/or consecutive) pixels is within a predetermined range or correspond to the energy level of the radiopharmaceutical isotope. In some embodiments, the predetermined range may be the same as the range used to determine at 20 if the energy from a single pixel corresponded to the isotope energy. In other embodiments, a different range may be used. For example, a correction factor may be applied to the range (and/or to the summed energy of adjacent pixels) to account for energy that imposes upon a gap between pixels instead of directly upon the pixels. It should be understood that the predetermined range at 30 corresponding to multiple events may be different from the predetermined range at 20 corresponding to a single event. The ratio between the values of the predetermined ranges at 20 and 30, for example, may be proportional to or otherwise specified by a correction factor or formula, discussed herein, that may be used to compensate for charge loss of split (shared) events produced in the gaps between the pixels (anode contacts).

At 32, if the summed energy is not within the predetermined range or does not correspond to the energy of the isotope, the event is disregarded and not counted.

At 34, if the summed energy is within the predetermined range or corresponds to the energy of the isotope, the event is counted. In some embodiments, the event may be counted as a single event for one of the adjacent pixels. For example, the pixel for which the event is counted may be randomly chosen or arbitrarily assigned. As another example, the event may be counted for the individual pixel providing the largest contribution to the summed energy (e.g., the pixel with the highest individual energy). In other embodiments, the event may be split into partial events counted for each adjacent pixel. As one example, for an event to be counted using energies from two adjacent pixels, each of the two adjacent pixels may have ½ (0.5) of an event counted. As another example, the share of the event may be apportioned based on the relative values of the reported energies. For example, a first pixel providing 75% of the summed energy may have 0.75 event added to the count for the first pixel, while an adjacent second pixel providing 25% of the summed energy may have 0.25 event added to the count for the adjacent second pixel.

At 36, it is determined if more reading cycles are to be performed. For example, in some embodiments, a scan may be intended to be performed for a predetermined or specified amount of time. If the predetermined or specified amount of time has not elapsed, one or more additional reading cycles may be performed. As another example, a scan may continue until a predetermined number of total counted events are obtained. If more reading cycles are to be performed, the method 100 proceeds to 38. At 38, any P&H flags previously set to identify a pixel receiving energy or requesting a reading in previous cycles (e.g., one or more flags set at 14) are re-set (if not already re-set, at 18) to an off or idle position, and the method proceeds to 12 to begin a new reading cycle. In various embodiments, any values being maintained in a P&H may be read in the next reading-cycle, released or set to zero.

At 40, an image is generated. For example, a running total of events counted for each pixel of the detector may be maintained. The total count for each pixel may be used to select a shade or value on a gray scale for a corresponding pixel or portion of an image.

Thus, in various embodiments, summing of energies of two or more adjacent and/or consecutive pixels of a detector may be utilized to identify events corresponding to charge-sharing or Compton Scattering in the detector, without requiring or employing the use of time-coincidence measurements and, in some embodiments, also without employing neighbor-checking. Various embodiments also provide systems configured to perform summing of energies without requiring or employing the use of time-coincidence measurements and, in some embodiments, also provide systems configured to perform summing of energies without employing neighbor-checking.

Figure 2:
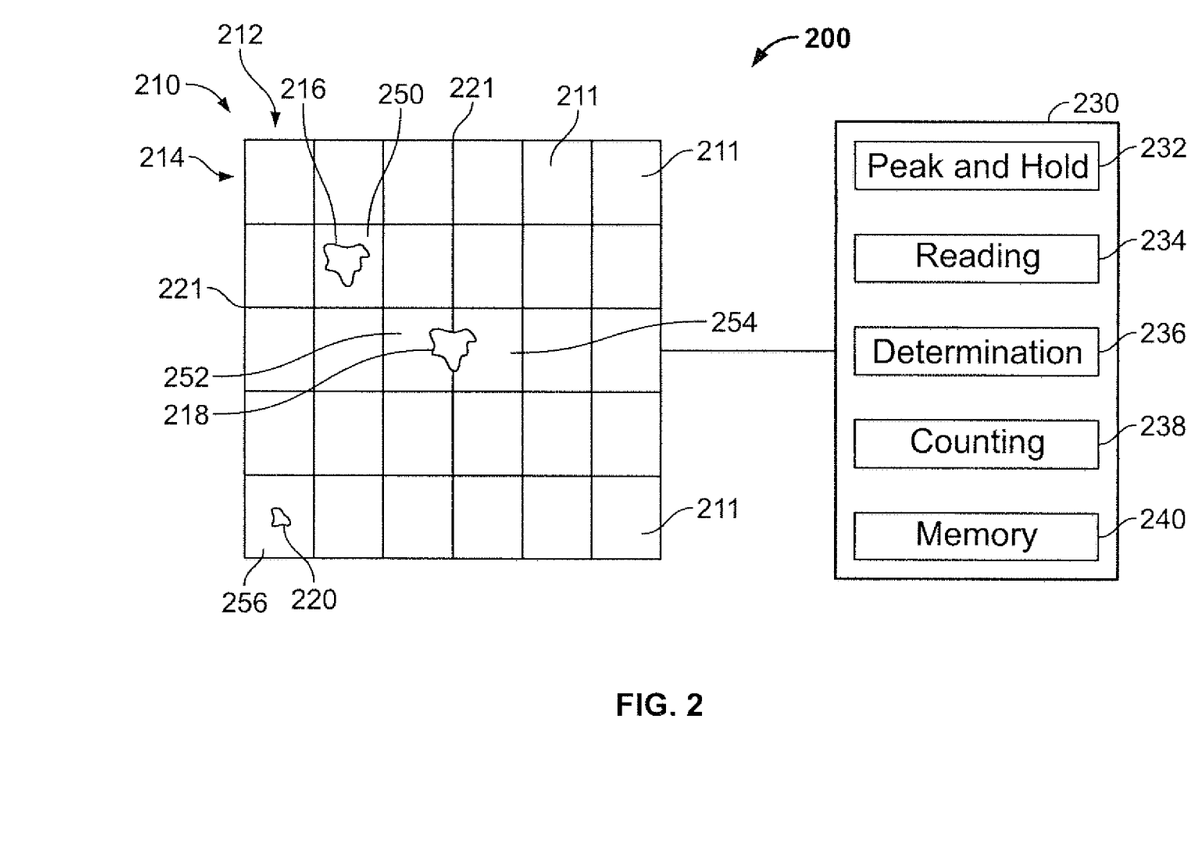
FIG. 2 is a schematic view of a system in accordance with various embodiments.

For example, FIG. 2 provides a schematic view of a system 200 formed in accordance with various embodiments. The system 200 includes a detector 210 and a processing module 230. The detector in the illustrated embodiment is configured as a pixelated detector. Generally, the depicted detector 210 detects events corresponding to a NM scan (e.g., received photons), and the processing module 230 analyzes the events to produce imagining information. For additional details on various example embodiments of detectors, see FIGS. 3 and 4 and the related discussion. For additional details on various example embodiments of NM imaging systems, see FIGS. 5 and 6 and the related discussion.

Returning to FIG. 2, the detector 210 may include multiple pixels, with each pixel configured to detect an event corresponding to the receipt of energy by the pixel. For example, the energy may be received during a NM scan, with energy from a radiopharmaceutical previously administered to a patient being received by one or more pixels of the detector 210 during the scan. In the illustrated embodiment, the detector 210 includes pixels 211 arranged in columns 212 and rows 214. The pixels 211 are separated by gaps 221.

Based on energy levels received by one or more pixels, the processing module 230 may determine if a detected event is suitable for use in imaging (e.g., whether the event should be counted or not). Three example types of events are depicted in FIG. 2. A first event 216 corresponds to a true event that should be counted corresponding to incidence of a photon from an administered radiopharmaceutical being received entirely by a single pixel 250. A second event 218 corresponds to a true event that should be counted corresponding to incidence of a photon from an administered radiopharmaceutical being received by two adjacent pixels 252, 254 (as well as a gap between the pixels 252, 254). A third event 220 corresponds to energy received by a single pixel 256 that does not correspond to an event that should be counted.

Generally, in various embodiments, the processing module 230 may be understood as a processing circuitry module and may include processing circuitry such as one or more field programmable gate array (FPGA), application specific integrated circuit (ASIC), or microprocessor. The processing module 230 in various embodiments may be configured to execute one or more algorithms to perform functions or operations described herein. The one or more algorithms may include aspects of embodiments disclosed herein, whether or not expressly identified in a flowchart or as a step of a method.

The processing module 230, for example, may be configured to obtain a request for a reading of energy. The request may be generated by a pixel, by a processor associated with the pixel, and/or an aspect or portion of the processing module 230, for example a sub-module of the processing module 230. The request may be generated based upon receipt of energy by a pixel. For example, the request may be generated based upon a signal being present in a P&H corresponding to a pixel and/or to the setting of a flag corresponding to the pixel. The processing module 230 may also be configured to determine an energy level for each pixel of the detector that detects received energy during a reading cycle. For example, the energy level of each pixel that detects received energy above a predetermined level (e.g., a threshold level configured to remove signals based solely on noise) may be read. In some embodiments, during a given reading cycle, only those pixels for which a reading is requested (e.g., pixels having a signal in a corresponding P&H) may have energy read or determined, while energy for other pixels is not read or determined. Further, in some embodiments, for any pixel for which a reading is requested having an energy level below the energy range of the isotope, an energy level for one or more adjacent pixels may be identified. For example, adjacent pixels may be checked to determine if any adjacent pixels have indicated received energy (e.g., if a flag has been set for any adjacent pixels). In some embodiments, the energy of each pixel adjacent to a requesting pixel may be read or determined. Further still, in some embodiments, the energy of adjacent pixels may be considered together only if the energy was received in consecutive events. Yet in other embodiments, no neighbor-checking may be performed when consecutive events are summed.

For example, responsive to a request for a reading of a first pixel identified as having received energy, the processing module 230 may determine or read the energy level for the first pixel. If the energy level for the first pixel corresponds to the energy level of an isotope of an administered radiopharmaceutical (e.g., falls within a range of a nominal energy level of the isotope), the event may be counted by the processing module 230 as an event suitable for use in imaging. However, if the energy level for the first pixel is below the lower limit of the range, the energy level of one or more pixels adjacent to the first pixel may be identified. The energy level of adjacent pixels may, in some embodiments, only be considered if the events producing the received energies of the adjacent pixels occurred within the same reading cycle and/or were consecutive events (e.g., one event immediately preceded the other event with no intervening events). If the combined energy level of the adjacent pixels corresponds to the energy level of the isotope (in some embodiments, the range of the isotope and/or the combined energy level of the pixels may be adjusted by a correction factor to account for impingement of energy upon a gap between adjacent pixels), then the event may be counted by the processing module 230 as an event suitable for use in imaging. If the combined energy level does not correspond to the energy of the isotope (e.g., is not within a predetermined range), then the event may be disregarded and not counted or used in connection with generating an image.

In the illustrated embodiment, the processing module 230 includes a peak and hold module 232, a reading module 234, a determination module 236, a counting module 238, and a memory 240. The memory 240 may include a tangible and non-transitory computer readable storage medium. The depicted arrangement is provided by way of example for illustrative purposes. It should be noted that one or more aspects may be shared among modules, combined, split into separate modules or sub-modules, or the like.

In the illustrated embodiment, the peak and hold module 232 maintains a reading of energy received by any given pixel during a reading cycle at or near a peak level for each event of received energy. In various embodiments, the peak and hold module 232 may include circuitry, including one or more capacitors or similar components, configured to maintain a peak value of a received signal. In the illustrated embodiment, the peak and hold module 232 is shown as a part of the processing module 230, but in other embodiments the peak and hold module 232 may be a part, portion, or aspect of the detector 210 including an ASIC, or otherwise external to the processing module 230. The processing module 230, or a portion or aspect of the processing module 230, may be included in an ASIC that is integrated with the detector 210. In some embodiments, the peak and hold module 232 may set a flag and/or transmit a request for an energy level reading for each channel or pixel having a non-zero value, which is above a threshold level and is maintained in the peak and hold module 232. The processing module 230 (or sub-module thereof) may determine the energy level of a given pixel using information from the peak and hold module 232.

The depicted reading module 234 is configured to read or determine the energy level for any pixels experiencing an energy receiving event during a reading cycle. For example, the reading module 234 may read an energy level from the peak and hold module 232. In some embodiments, the reading module 234 may read or receive an energy level directly from a pixel, for example via an electronic channel in an ASIC. The reading module 234 may be configured to read or determine energy levels only for pixels reporting received energy (e.g., pixels for which a flag has been set and/or pixels that have requested an energy level reading). In some embodiments, the reading module 234 may be configured to read or determine energy levels only for pixels reporting received energy (e.g., pixels for which a flag has been set and/or pixels that have requested an energy level reading) and for pixels immediately adjacent to pixels reporting received energy, which may report received energy via flags as well. After the reading of a reporting pixel or pixels, the reading module 234 may re-set the reporting flag or flags.

In the illustrated embodiment, the determination module 236 is configured to determine, based on the energy level for a pixel and/or one or more adjacent pixels, whether an event (or events) of received energy is to be counted or used in conjunction with imaging. For example, the determination module 236 may obtain an energy level for a pixel from the reading module 234 (or, in other embodiments, from the detector 210 and/or the peak and hold module 232). The determination module 236 may then compare the energy level to a range corresponding to an energy level of an administered radiopharmaceutical. If the energy level is within the range, the determination module 236 may identify the event as a true event appropriate for counting or using to generate an image. If the energy level is not within the range, the determination module 236 may then determine if any adjacent pixels have an energy level corresponding to received energy. If not, then the determination module 236 may determine that the event should not be counted or used in conjunction with generating an image.

If an energy level for received energy is indicated for an adjacent pixel (or, in some embodiments, adjacent pixels), the determination module 236 may then sum the energies of the pixel and adjacent pixel(s). In some embodiments, the determination module 236 may first determine if energy received by adjacent pixels was received in consecutive events, and only consider energy received in consecutive events. For example, if a first event of received energy is identified for a first pixel, a second immediately subsequent event is recorded for a non-adjacent pixel, and third event is recorded later still for a pixel adjacent to the first pixel, the energies for the first and third events may not be combined in some embodiments because the first and third events were not consecutive. Alternatively, in some embodiments, no neighbor-checking is performed, and the values of the energies of consecutive events (as discussed herein) are summed. If the summed or combined energy is within the range, the determination module 236 may identify the event as a true event appropriate for counting or using to generate an image. If not, then the determination module 236 may determine that the event should not be counted or used in conjunction with generating an image. Information for events to be counted (e.g., information identifying a particular pixel or pixels for which an event is to be counted) may be provided by the determination module 236 to the counting module 238. In some embodiments, the determination module 236 may be configured to consider energy from only one pixel adjacent to a given pixel, while in other embodiments, the determination module 236 may be configured to consider energy from plural adjacent pixels to a given pixel.

By way of illustration, an example analysis of the events depicted in FIG. 2 by the processing module 230 will now be discussed. The first event 216, as indicated above, corresponds to a true event that should be counted corresponding to incidence of a photon from an administered radiopharmaceutical being received entirely by the pixel 250. Responsive to the setting of a flag and/or a request for reading the energy of the pixel 250, the processing module 230 may determine that the energy received by the pixel 250 is within a predetermined range corresponding to a radiopharmaceutical. Accordingly, the processing module 230 may determine that the event should be counted, and add a count for the pixel 250 to a running total.

As indicated above, the second event 218 corresponds to a true event that should be counted corresponding to incidence of a photon from an administered radiopharmaceutical being received by the two adjacent pixels 252, 254 (as well as a gap 221 between the pixels 252, 254). Responsive to the setting of a flag and/or a request for reading the energy of the pixel 252, the processing module 230 may determine that the energy received by the pixel 252 is not within the predetermined range. The processing module 230 may then determine if any pixels adjacent to the pixel 252 have received energy (in some embodiments, the processing module 230 may determine if any adjacent pixels have received energy in events consecutive with the reception of energy by the pixel 252), and identify the pixel 254 as a pixel that has received energy and that is adjacent to the pixel 252. In alternative embodiments, the values of the energies corresponding to consecutive events in event-pairs (as discussed herein) are summed without performing neighbor-checking. The processing module 230 may then sum the received energies and determine that the combined energy is within a predetermined range corresponding to the pharmaceutical. In some embodiments, the predetermined range may be the same as a predetermined range used with energy from a single pixel (e.g., the predetermined range used in connection with the first event 216), while in other embodiments the predetermined range used for energy shared between or among adjacent pixels may be adjusted to account for energy impinging on one or more gaps between adjacent pixels. With the combined energy within the predetermined range, the processing module 230 may count the event for one of the adjacent pixels, or, may count a partial event for each of the adjacent pixels receiving energy.

As indicated above, the third event 220 corresponds to energy received by a single pixel 256 that does not correspond to an event that should be counted. Responsive to the setting of a flag and/or a request for reading the energy of the pixel 256, the processing module 230 may determine that the energy received by the pixel 256 is not within the predetermined range. The processing module 230 may then determine if any pixels adjacent to the pixel 256 have received energy within the same reading cycle and/or consecutively with the third event 220, and determine that no adjacent pixels have received energy. Accordingly, the third event 220 may be disregarded or not counted, and not used in connection with generating an image.

The depicted counting module 238 is configured to keep or maintain a running count of events for each pixel over a plurality of reading cycles during a scan. When a scan is complete (e.g., no additional reading cycles are to be performed) the counting module 238 may assign a level on a grayscale for each pixel corresponding to that pixel's total number of counted events. For example, brighter shades may be used for pixels having higher counts. The processing module 230, in some embodiments, may then generate an image using the shade or grayscale value of each pixel for a corresponding pixel or portion of the image.

As indicated above, errors associated with reading cycles and energy summing may be possible. An example calculation of the probability error will now be discussed. For the example calculation, the following values will be used:
 (1) N: the number of pixels in a detector module=256
 (2) R: the average count rate per pixel per second in nuclear imaging=10-cps
 (3) $t_r$: the reading time of a single electronic channel=2 μs
 (4) $N_A$: the normalized area of the detector spectrum defined as the fraction of events in the energy-window ΔE out of the total number of events in the whole spectrum=60%
 (5) $th_r$: the threshold energy=28 KeV
 (6) ΔE: The energy window which is equal to Full Width Half Maximum (FWHM) of the spectrum=6 KeV
 (7) $E_i$: the energy of the isotope used for the imaging=140 KeV First, the probability of reading random events that appear simultaneously in adjacent pixels, and mistakenly considering the random events as charge-sharing or Compton Scattering in the detector will be calculated. The average count rate $R_M$ over the whole detector-module, which is read by the readout unit of the ASIC is given by:

$$R_M = N \cdot R = 256 \cdot 10 - = 2560 \text{ cps} \qquad \text{Eq(1)}$$

The average time-period $\Delta t_P$ between events in the detector module is given by:

$$\Delta t_P = 1/\cdot R_M = 1/2560 \approx 400 \text{ μs} \qquad \text{Eq(2)}$$

This means that the average time-period $\Delta t_P$ between events in the detector module is much larger than the reading time of a pixel (a single electronic channel) of the readout unit $t_r$, which may be only about 2 μs. Accordingly, there may be no accumulation of unread events. As mentioned above, only electronic-channels which have a signal in a P&H and have sent a request signal are read. Thus, on average, there may be only one event to read in each reading cycle of the module, with the event being read immediately. Thus, each event will be read in the order of appearance (creation).

An exception may occur when multiple events appear simultaneously, such as in the following situations: (a) Charge sharing; (b) Compton-scattering in the detector; (c) Random-coincidence of multiple events in adjacent pixels; and (d) Random-coincidence of multiple events in the same pixels or in non-adjacent pixels.

In various embodiments, situations (a)-(b) are accepted using criteria set forth herein. These events of situations (a)-(b), are read while neighbor-summing is performed. Accordingly, in situations (a)-(b) there are no reading errors. In various embodiments, situation (c) may also be accepted by the criteria described herein; however, unlike situations (a)-(b) which correspond to a photon detection that should be used in imaging, situation (c) should not be used for imaging but may be mistakenly read as an event of charge-sharing or Compton-scattering in the detector. In situation (d), the events are rejected by the energy criterion discussed herein. Therefore, for situation (d), no reading is performed and no error is induced.

It may be noted that the probability $P_r$ for random-coincidence error is proportional to the probability to have random-coincidence in one of the 4 adjacent pixels and is calculated according to Poisson-distribution. This error probability $P_r$ is equal to the probability P(>1) to have more than one event in an area that is equal to the total area of a certain pixel and its four adjacent pixels (total of 5 pixels) in a time period that is equal to the reading time $t_t$ of the whole module (up to 256 pixels). The probability P(>1) to have more than one event is given by the following:

$$P(>1) = 1 - [P(0) + P(1)] = 1 - \frac{\lambda^0 \cdot e^{-\lambda}}{0!} - \frac{\lambda^1 \cdot e^{-\lambda}}{1!} = \qquad \text{Eq(3)}$$
$$1 - e^{-\lambda}(1+\lambda) \approx 1 - (1-\lambda) \cdot (1+\lambda) = 1 - (1-\lambda^2) = \lambda^2$$

Where P(>1) is the probability to have more than 1 event; P(0) Is the probability to have 0 events; P(1) is the probability to have 1 event; and λ is the average number of events occur in the above mentioned 5 pixels (a certain pixel and its 4 neighbors) during the reading time $t_t$ of the whole module (up to 256 pixels).

It may be noted that over estimation of the reading time $t_t$ of the entire module is assumed under the situation that all the 256 pixels in the module generate a P&H signal and are read by the readout unit. In this overestimated case, $t_t=256 \cdot t_r = 512$ μs ($t_r$ is the reading time of a single pixel). The value of λ is given by the following:

$$\lambda = N_n \cdot R \cdot t_t = 5 \cdot 10 \cdot 512 \cdot 10^{-6} = 25.6 \cdot 10^{-3} \qquad \text{Eq(4)}$$

Where $N_n$ is equal to 5 and represents the total number of pixels including a pixel and its 4 adjacent pixels. As mentioned above, R=10 is the average rate per pixel per second. Since $\lambda = 25.6 \cdot 10^{-3}$ is small, the approximation $e^{-\lambda} \approx (1-\lambda)$ done in Eq(3) is justified. Accordingly, the error probability $P_r$ to have random coincidence in the above mentioned 5 pixels is given by the following:

$$P_r = P(>1) = \lambda^2 = 6.5 \cdot 10^{-4} \qquad \text{Eq(5)}$$

It may be noted that a second error probability is equal to the probability $P_E$ of summing the energy of two adjacent events that randomly coincide in adjacent pixels to receive energy that falls within a predetermined energy range (e.g., is equal to the energy $$E_i \mp \frac{\Delta E}{2}$$

of the isotope used for the imaging, as measured by the detector.) To satisfy this condition: $E_1 + E_2 = E_i$, each of the randomly coincident photons may be measured with energies $E_1$ and $E_2$, respectively, which are less than $$E_i - \frac{\Delta E}{2}$$

and above the threshold energy $th_r$. The probability $P(E_1)$ that the first event in the first pixel out of the pixels involved with the random-coincidence has energy that is not useful for the imaging and is in the range between the threshold energy $th_r$ and the energy $$E_i - \frac{\Delta E}{2}$$

is given by the following:

$$P(E_1) = (1-N_A) = 1-60\% = 40\% = 0.4 \qquad \text{Eq(6)}$$

Above, $E_i$ is the isotope energy, and $\Delta E$ is the energy width of the detector spectrum. Once the energy $E_1$ of the first photon is determined, the energy $E_2$ of the second photon may also be determined since the energy of the second photon should satisfy the condition: $E_1+E_2=E_i$. In this case, the probability $P(E_2)$ to occur with a single possible value $E_2$ is equal to the probability $P(E_1)$ of the first event $(1-N_A)=0.4$ to be out of the spectrum peak in the energy range between the threshold energy $th_r$ and the energy $$E_i - \frac{\Delta E}{2}$$

times the probability $$\frac{1}{(E_i - \Delta E - th_r)}$$

to have a single value $E_2$ in the energy range between the threshold energy $th_r$ and the energy $$E_i - \frac{\Delta E}{2}.$$

The product of these probabilities is given by the following:

$$(1 - N_A) \cdot \frac{1}{(E_i - \Delta E - th_r)} \qquad \text{Eq(7)}$$

For imaging purposes the allowed energy window has an energy-width $\Delta E$ and, thus, the energy value of the second photon can be in a range $\Delta E$ around the value $E_2$ that satisfies $$E_1 + \left(E_2 \mp \frac{\Delta E}{2}\right) = E_i \mp \frac{\Delta E}{2}.$$

Accordingly, the probability to have the second photon energy summed up with the first photon to be equal to $$E_i \mp \frac{\Delta E}{2}$$

is given by the following:

$$(1 - N_A) \cdot \frac{\Delta E}{(E_i - \Delta E - th_r)} = 0.4 \cdot \frac{6 \text{ Kev}}{(122 - 6 - 28) \text{ Kev}} = 0.027 \qquad [8]$$

Accordingly, from equations (6) and (8) the probability may be determined for (1) having a first event with energy out of the range suitable for imaging, and (2) having a second event that randomly coincides with the first event, with the second event having energy that is summed with the energy of the first event to produce summed energy that is suitable for imaging. This probability is the product of the probabilities given by equations (6) and (8):

$$0.4 \cdot 0.027 = 1\% = 10^{-2} \qquad \text{Eq(9)}$$

Accordingly, from equations (5) and (9) the total probability for error may be understood as the probability that all the following will occur simultaneously: (1) having random-coincidence in one of the four adjacent pixels; (2) having a first event with energy out of the range suitable for imaging, and (3) having a second event that randomly coincides with the first event, while the second event is located at an adjacent pixel and having energy that is summed together with the energy of the first event to produce summed energy that is suitable for imaging. In the example scenario, this may be understood as $6.5 \cdot 10^{-4} \cdot 10^{-2} = 6.5 \cdot 10^{-6}$. Accordingly, the combination of rejection-criteria for the example scenario enables performance of neighbor-summing of signals from adjacent pixels with very low probability for errors (e.g., about 0.00065%). It may be noted that a similar very low probability for error, in summing the values of the energies received from adjacent pixels, may be achieved in embodiments that employ only the following selection criteria: 1) summing is performed only for consecutive events in event-pairs (as discussed herein) and 2) summed events are used for the imaging only if the summed value of the energies is within a predetermined value that corresponds to the energy of the isotope used for the imaging. In various embodiments, no other criteria such as time coincidence or neighbor checking may be employed in achieving a low error probability.

Figure 3:
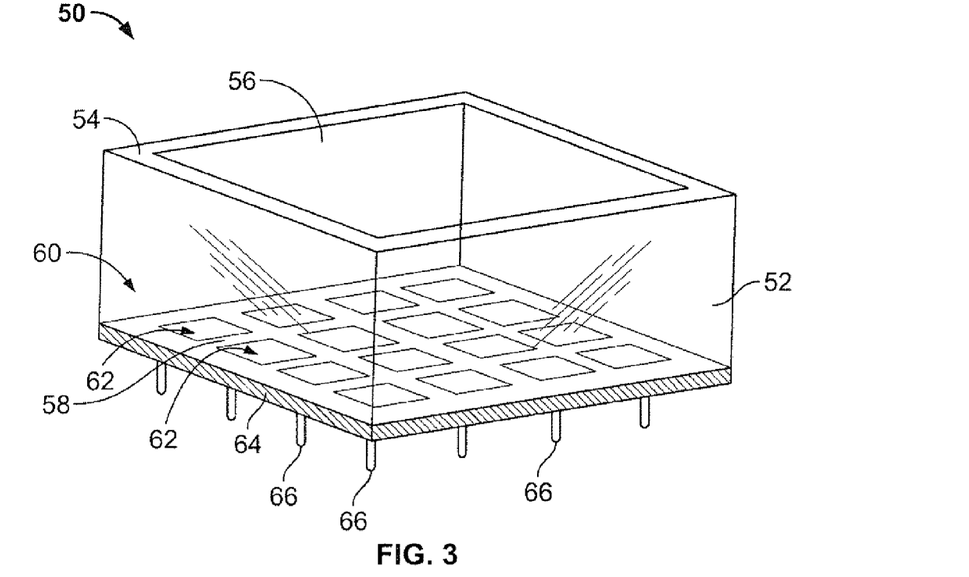
FIG. 3 is a top perspective view of a pixelated photon detector formed in accordance with one embodiment.

Various methods in accordance with embodiments, such as the method 100, may be used in connection with, for example, a pixelated detector 50 as shown in FIG. 3, which in various embodiments is formed from CZT. It should be noted that the size, shape and connection of the electrodes may be modified as desired or needed.

It should be noted that the pixelated detectors 50 in various embodiments may be formed from CZT or CdTe. The pixelated detectors 50 include a crystal 52 formed from the semiconductor material. A face 54 of the crystal 52 in some embodiments (as illustrated) includes a single cathode electrode 56. An opposite face 58 of the crystal 52 includes an anode 60 having an array of anode pixels 62. The anode pixels 62 may be of substantially the same size and form generally square shaped pixels 62. In various embodiments, the number of anode pixels 62 may be greater or less than the number shown. It also should be noted that the thickness of the crystal 52 may vary between less than one millimeter to several centimeters. In some embodiments, a thickness of several millimeters is used so as to substantially absorb at least a large portion of the impinging photons. Thus, the thickness depends on the energy of the photon to be detected. In operation, a voltage difference applied between the cathode electrode 56 and the anode 60 generates an electric field in the crystal 52.

In operation, when a photon having energy typical of the energies of photons used in SPECT, X-ray, CT or PET applications is incident on the crystal 52, the photon generally interacts with the crystal 52 and pairs of mobile electrons and holes in a small localized region of the crystal 52 are generated through a secondary ionization process. As a result of the applied electrical field, the holes drift to cathode 56 and the electrons drift to anode 60, thereby inducing charges (also referred to as charge clouds or electron clouds) on the anode pixels 62 and the cathode 56. The induced charges on anode pixels 62 are sensed and may be partially preprocessed by appropriate electronic circuits (e.g., application specific integrated circuits (ASICs)) within a detector base 64 and on which the pixelated detector 50 is mounted. For example, a plurality of channels forming a readout amplifier chain may be provided. The detector base 64 includes connection members, for example, connection pins 66 for mounting to a motherboard (not shown) and transmitting signals from the ASICs to the motherboard. Signals from the induced charges on anode pixels 62 are used to determine charge information, including any or all of the time at which a photon is detected, how much energy the detected photon deposited in the crystal and where in the crystal the photon interaction took place as described in more detail herein (e.g., using a row/column summing method). This information may then be used to reconstruct an image as known in the art.

Figure 4:
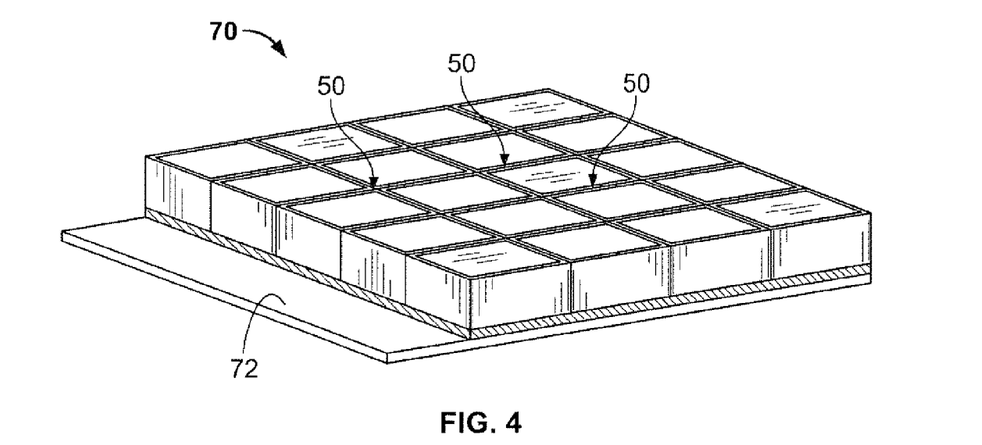
FIG. 4 is a top perspective view of a gamma camera including a plurality of pixelated photon detectors.

FIG. 4 illustrates a rectangular gamma camera 70 that includes a plurality, for example, twenty pixelated detectors 50 arranged to form a rectangular array of five rows of four detectors 50. The pixelated detectors 50 are shown mounted on a motherboard 72. It should be noted that gamma cameras having larger or smaller arrays of pixelated detectors 50 may be provided. It should also be noted that the energy of a photon detected by a pixelated detector 50 is generally determined from an estimate of the total number of electron-hole pairs produced in the crystal 52 of the detector 50 when the photon interacts with the material of the crystal 52. This count is generally determined from the number of electrons produced in the ionizing event, which is estimated from the charge collected on the anode 60 of the detector 50 using the various embodiments.

If all the electrons and holes produced by a photon detected in the detector 50 are properly collected by the detector electrodes, then the induced charge on either the anode 60 or the cathode 56 of the detector 50 is a correct measure of the energy of the photon. However, the energy response for each pixel, and in particular, the peak position for each peak may shift in the energy spectrum and affect the acquired data used to reconstruct an image. Using the various embodiments, the shifting may be minimized or corrected using a known relationship between the location of the pixels and the anode signals as controlled, for example, by the shaping and connection of the pixels.

Figure 5:
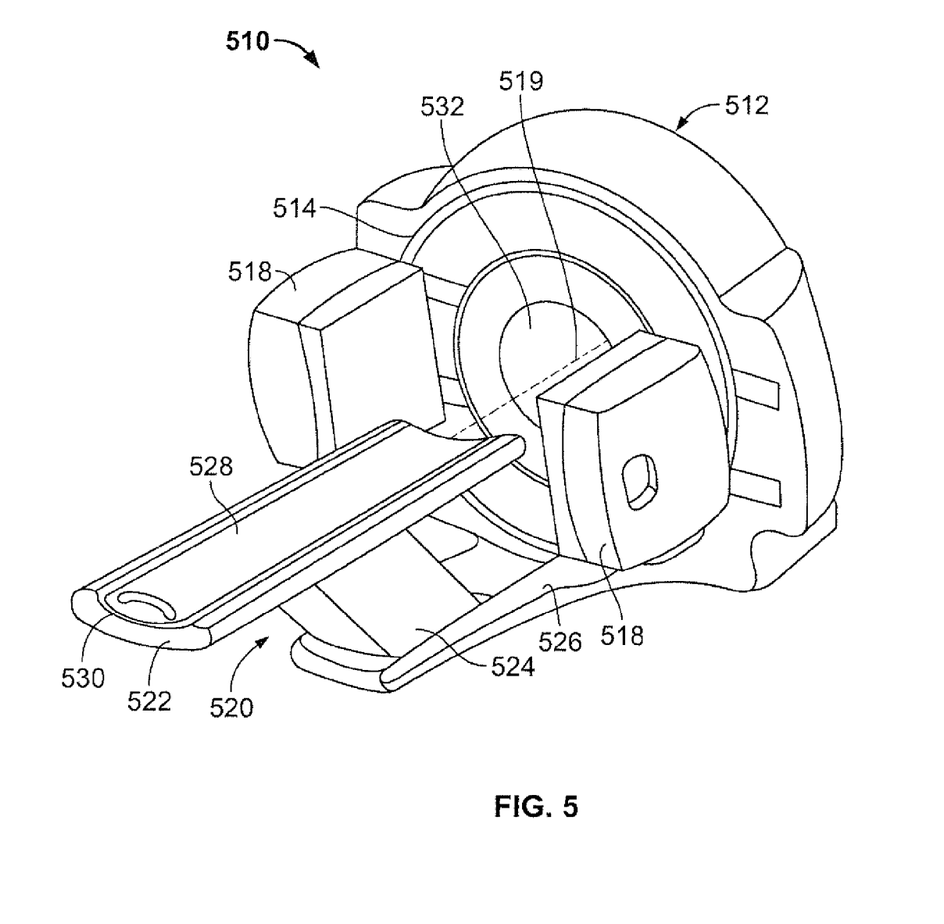
FIG. 5 is a perspective view of an exemplary nuclear medicine imaging system constructed in accordance with various embodiments.

The pixelated detectors of the various embodiments may be provided as part of different types of imaging systems, for example, NM imaging systems such as PET imaging systems, SPECT imaging systems and/or X-ray imaging systems and CT imaging systems, among others. For example, FIG. 5 is a perspective view of an exemplary embodiment of a medical imaging system 510 constructed in accordance with various embodiments, which in this embodiment is a SPECT imaging system. The system 510 includes an integrated gantry 512 that further includes a rotor 514 oriented about a gantry central bore 532. The rotor 514 is configured to support one or more NM pixelated cameras 518 (two cameras 518 are shown), such as, but not limited to gamma cameras, SPECT detectors, multi-layer pixelated cameras (e.g., Compton camera) and/or PET detectors. It should be noted that when the medical imaging system 510 includes a CT camera or an x-ray camera, the medical imaging system 510 also includes an x-ray tube (not shown) for emitting x-ray radiation towards the detectors. In various embodiments, the cameras 518 are formed from pixelated detectors as described in more detail herein. The rotors 514 are further configured to rotate axially about an examination axis 519.

A patient table 520 may include a bed 522 slidingly coupled to a bed support system 524, which may be coupled directly to a floor or may be coupled to the gantry 512 through a base 526 coupled to the gantry 512. The bed 522 may include a stretcher 528 slidingly coupled to an upper surface 530 of the bed 522. The patient table 520 is configured to facilitate ingress and egress of a patient (not shown) into an examination position that is substantially aligned with examination axis 519. During an imaging scan, the patient table 520 may be controlled to move the bed 522 and/or stretcher 528 axially into and out of a bore 532. The operation and control of the imaging system 510 may be performed in any manner known in the art. It should be noted that the various embodiments may be implemented in connection with imaging systems that include rotating gantries or stationary gantries.

Figure 6:
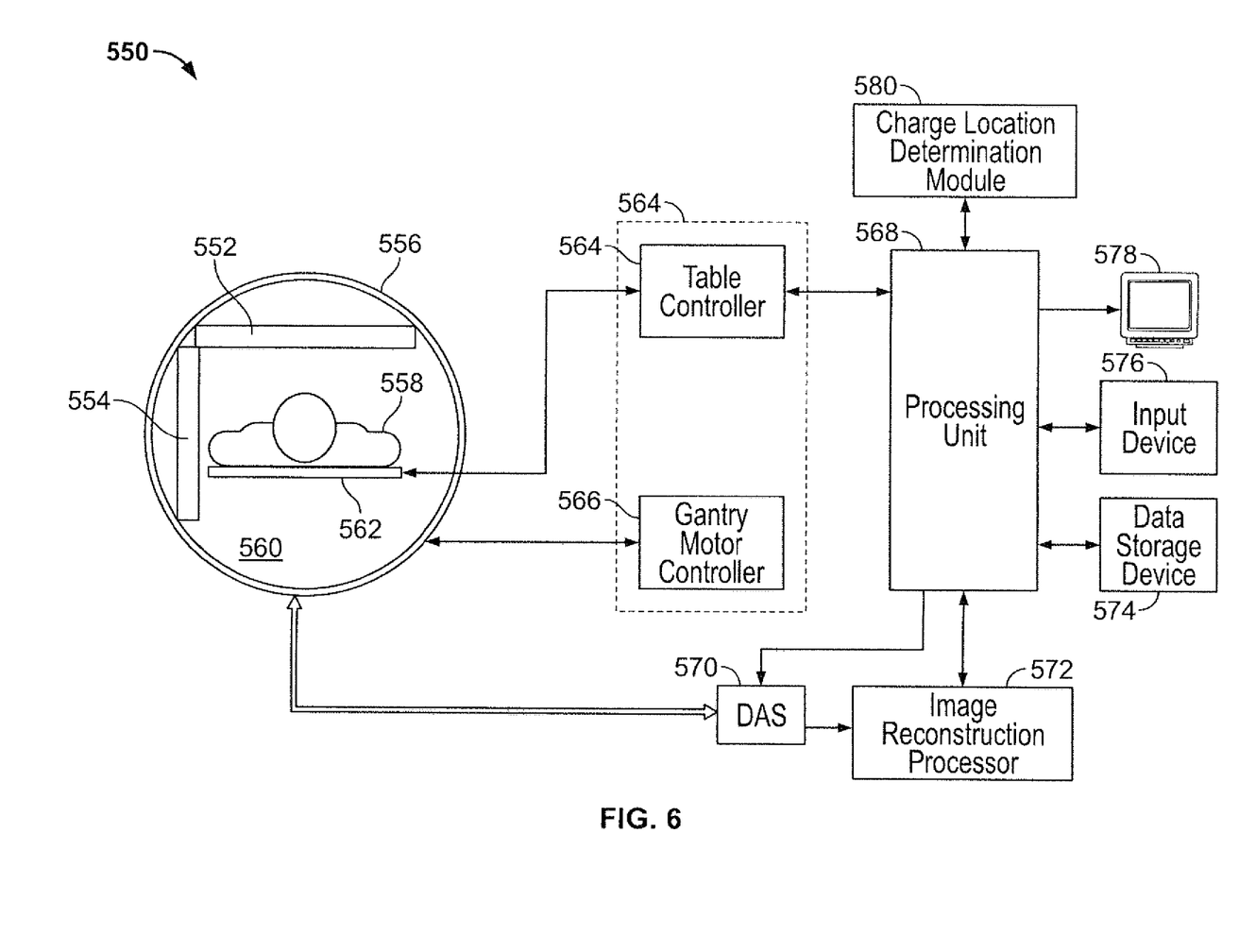
FIG. 6 is a block diagram of a nuclear medicine imaging system constructed in accordance with various embodiments.

FIG. 6 is a block diagram illustrating an imaging system 550 that has a plurality of pixelated imaging detectors configured in accordance with various embodiments mounted on a gantry. It should be noted that the imaging system may also be a multi-modality imaging system, such as an NM/CT imaging system. The imaging system 550, illustrated as a SPECT imaging system, generally includes a plurality of pixelated imaging detectors 552 and 554 (two are illustrated) mounted on a gantry 556. It should be noted that additional imaging detectors may be provided. The imaging detectors 552 and 554 are located at multiple positions (e.g., in an L-mode configuration) with respect to a patient 558 in a bore 560 of the gantry 556. The patient 558 is supported on a patient table 562 such that radiation or imaging data specific to a structure of interest (e.g., the heart) within the patient 558 may be acquired. It should be noted that although the imaging detectors 552 and 554 are configured for movable operation along (or about) the gantry 556, in some imaging systems, imaging detectors are fixedly coupled to the gantry 556 and in a stationary position, for example, in a PET imaging system (e.g., a ring of imaging detectors). It also should be noted that the imaging detectors 552 and 554 may be formed from different materials as described herein and provided in different configurations known in the art.

One or more collimators may be provided in front of the radiation detection face (not shown) of one or more of the imaging detectors 552 and 554. The imaging detectors 552 and 554 acquire a 2D image that may be defined by the x and y location of a pixel and the location of the imaging detectors 552 and 554. The radiation detection face (not shown) is directed towards, for example, the patient 558, which may be a human patient or animal. It should be noted that the gantry 556 may be configured in different shapes, for example, as a "C", "H" or "L".

A controller unit 564 may control the movement and positioning of the patient table 562 with respect to the imaging detectors 552 and 554 and the movement and positioning of the imaging detectors 552 and 554 with respect to the patient 558 to position the desired anatomy of the patient 558 within the fields of view (FOVs) of the imaging detectors 552 and 554, which may be performed prior to acquiring an image of the anatomy of interest. The controller unit 564 may have a table controller 564 and a gantry motor controller 566 that each may be automatically commanded by a processing unit 568, manually controlled by an operator, or a combination thereof. The table controller 564 may move the patient table 558 to position the patient 558 relative to the FOV of the imaging detectors 552 and 554. Additionally, or optionally, the imaging detectors 552 and 554 may be moved, positioned or oriented relative to the patient 558 or rotated about the patient 558 under the control of the gantry motor controller 566.

The imaging data may be combined and reconstructed into an image, which may comprise 2D images, a 3D volume or a 3D volume over time (4D).

A Data Acquisition System (DAS) 570 receives analog and/or digital electrical signal data produced by the imaging detectors 552 and 554 and decodes the data for subsequent processing as described in more detail herein. An image reconstruction processor 572 receives the data from the DAS 570 and reconstructs an image using any reconstruction process known in the art. A data storage device 574 may be provided to store data from the DAS 570 or reconstructed image data. An input device 576 also may be provided to receive user inputs and a display 578 may be provided to display reconstructed images.

Moreover, a charge location determination module 580 may be provided to determine a location of a charge or a charge cloud generated by photon (e.g., emission gamma photon or transmission x-ray photons) as described in more detail herein. The charge location determination module 580 may be implemented in software, hardware or a combination thereof.

It should be noted that the particular arrangement of components (e.g., the number, types, placement, or the like) of the illustrated embodiments may be modified in various alternate embodiments. In various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), a given module or unit may be added, or a given module or unit may be omitted.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
   a detector comprising multiple pixels, the pixels configured to detect an event corresponding to energy received during a nuclear medicine (NM) scan using a radiopharmaceutical; and
   a processing module comprising at least one processor and at least one memory comprising a tangible and non-transitory computer readable storage medium, the processing module configured to:

determine, responsive to a request for a reading of energy for an identified pixel of the detector that detects received energy above a predetermined level during a reading cycle, an energy level of the energy for the identified pixel; and for the identified pixel, count the event for the identified pixel when the energy level of the identified pixel is determined to correspond to an energy of the radiopharmaceutical;

identify an energy level of at least one adjacent pixel and determine the combined energy level of the identified pixel and the at least one adjacent pixel when the energy level of the identified pixel is determined not to correspond to the energy of the radiopharmaceutical;

count the event for at least one of the identified pixel or the at least one adjacent pixel when the combined energy level is determined to correspond to the energy of the radiopharmaceutical; and disregard the event when the combined energy level is determined not to correspond to the energy of the radiopharmaceutical.

2. The system of claim 1, wherein the processing module is configured to generate an image using events counted in plural reading cycles including the reading cycle.

3. The system of claim 1, wherein the processing module is configured to determine energy levels for requesting pixels and to not determine energy levels for non-requesting pixels.

4. The system of claim 1, wherein the processing module is configured to determine a combined energy level for at least one group of no more than two adjacent pixels.

5. The system of claim 4, wherein the processing module is configured to count the event for only one of the two adjacent pixels.

6. The system of claim 4, wherein the processing module is configured to count at least a partial event for each of the two adjacent pixels when the combined energy level is determined to correspond to the energy of the radiopharmaceutical.

7. The system of claim 1, wherein the processing module is configured to determine the energy level of a given pixel using information from a peak and hold module.

8. A method comprising:

detecting, during a reading cycle, with a multi-pixel detector, an event corresponding to energy received during a nuclear medicine (NM) scan using a radiopharmaceutical;

requesting a reading of energy for an identified pixel that detects received energy above a predetermined level;

determining an energy level of the energy for the identified pixel responsive to the request; and for the identified pixel, if the energy level of the identified pixel is determined to correspond to an energy of the radiopharmaceutical, counting the event for the identified pixel;

if the energy level of the identified pixel is determined not to correspond to the energy of the radiopharmaceutical, identifying an energy level of at least one adjacent pixel and determining the combined energy level of the identified pixel and the at least one adjacent pixel;

if the combined energy level is determined to correspond to the energy of the radiopharmaceutical, counting the event for at least one of the identified pixel or the at least one adjacent pixel; and if the combined energy level is determined not to correspond to the energy of the radiopharmaceutical, disregarding the event.

9. The method of claim 8, further comprising generating an image using events counted in plural reading cycles including the reading cycle.

10. The method of claim 8, wherein energy levels for non-requesting pixels are not determined.

11. The method of claim 8, further comprising determining a combined energy level for at least one group of no more than two adjacent pixels.

12. The method of claim 11, further comprising counting the event for only one of the two adjacent pixels.

13. The method of claim 11, further comprising counting at least a partial event for each of the two adjacent pixels when the combined energy level is determined to correspond to the energy of the radiopharmaceutical.

14. The method of claim 8, further comprising determining the energy level of a given pixel using peak and hold information for the given pixel.

15. A tangible and non-transitory computer readable medium comprising one or more computer software modules configured to direct one or more processors to:

detect, during a reading cycle, with a multi-pixel detector, an event corresponding to energy received during a nuclear medicine (NM) scan using a radiopharmaceutical;

request, based on the received energy, a reading of energy for an identified pixel that detects received energy above a predetermined level;

determine an energy level of the energy for the identified pixel responsive to the request; and for the identified pixel, if the energy level of the identified pixel is determined to correspond to an energy of the radiopharmaceutical, count the event for the identified pixel;

if the energy level of the identified pixel is determined not to correspond to the energy of the radiopharmaceutical, identify an energy level of at least one adjacent pixel and determine the combined energy level of the identified pixel and the at least one adjacent pixel;

if the combined energy level is determined to correspond to the energy of the radiopharmaceutical, count the event for at least one of the identified pixel or the at least one adjacent pixel; and if the combined energy level is determined not to correspond to the energy of the radiopharmaceutical, disregard the event.

16. The tangible and non-transitory computer readable medium of claim 15, wherein the computer readable medium is further configured to direct the one or more processors to generate an image using events counted in plural reading cycles including the reading cycle.

17. The tangible and non-transitory computer readable medium of claim 15, wherein energy levels for non-requesting pixels are not determined.

18. The tangible and non-transitory computer readable medium of claim 15, wherein the computer readable medium is further configured to direct the one or more processors to count the event for only one of a group of adjacent pixels when the combined energy level is determined to correspond to the energy of the radiopharmaceutical.

19. The tangible and non-transitory computer readable medium of claim 15, wherein the computer readable medium is further configured to direct the one or more processors to count at least a partial event for at least two of a group of adjacent pixels when the combined energy level is determined to correspond to the energy of the radiopharmaceutical.

20. The tangible and non-transitory computer readable medium of claim 15, wherein the computer readable medium is further configured to direct the one or more processors to determine the energy level of a given pixel using peak and hold information for the given pixel.

21. A method comprising:
- detecting, during a reading cycle, with a multi-pixel detector, plural events corresponding to energy received during a nuclear medicine (NM) scan using a radiopharmaceutical;
- requesting a reading of energy for one or more identified pixels that detect received energy;
- determining an energy level for at least an identified pixel of the one or more identified pixels responsive to the request; and
- for the identified pixel,
  - if the energy level of the identified pixel for an event is determined to correspond to an energy of the radiopharmaceutical, counting the event for the identified pixel;
  - if the energy level of the identified pixel is determined not to correspond to the energy of the radiopharmaceutical and if an average time between the plural events is longer than a time to complete the reading cycle, identifying an energy level of at least one additional pixel corresponding to an additional event occurring consecutively with the event, and determining the combined energy level of the identified pixel and the at least one additional pixel;
  - if the combined energy level is determined to correspond to the energy of the radiopharmaceutical, counting the event for at least one of the identified pixel or the at least one additional pixel; and
  - if the combined energy level is determined not to correspond to the energy of the radiopharmaceutical, disregarding the event.

22. A method comprising:
- detecting, during a reading cycle, with a multi-pixel detector, plural events corresponding to energy received during a nuclear medicine (NM) scan using a radiopharmaceutical;
- requesting a reading of energy for one or more identified pixels that detect received energy, wherein only energy for pixels identified as detecting received energy is read;
- determining an energy level for an identified pixel of the one or more identified pixels responsive to the request; and
- for the identified pixel,
  - if the energy level of the identified pixel for an event is determined to correspond to an energy of the radiopharmaceutical, counting the event for the identified pixel;
  - if the energy level of the identified pixel is determined not to correspond to the energy of the radiopharmaceutical, identifying an energy level of at least one additional pixel corresponding to an additional event occurring consecutively with the event, and determining the combined energy level of the identified pixel and the at least one additional pixel;
  - if the combined energy level is determined to correspond to the energy of the radiopharmaceutical, counting the event for at least one of the identified pixel or the at least one additional pixel; and
  - if the combined energy level is determined not to correspond to the energy of the radiopharmaceutical, disregarding the event.

* * * * *